Feb. 4, 1964  E. D. DALL  3,120,371
SEAT TRACK MECHANISM
Filed June 23, 1960  4 Sheets-Sheet 1
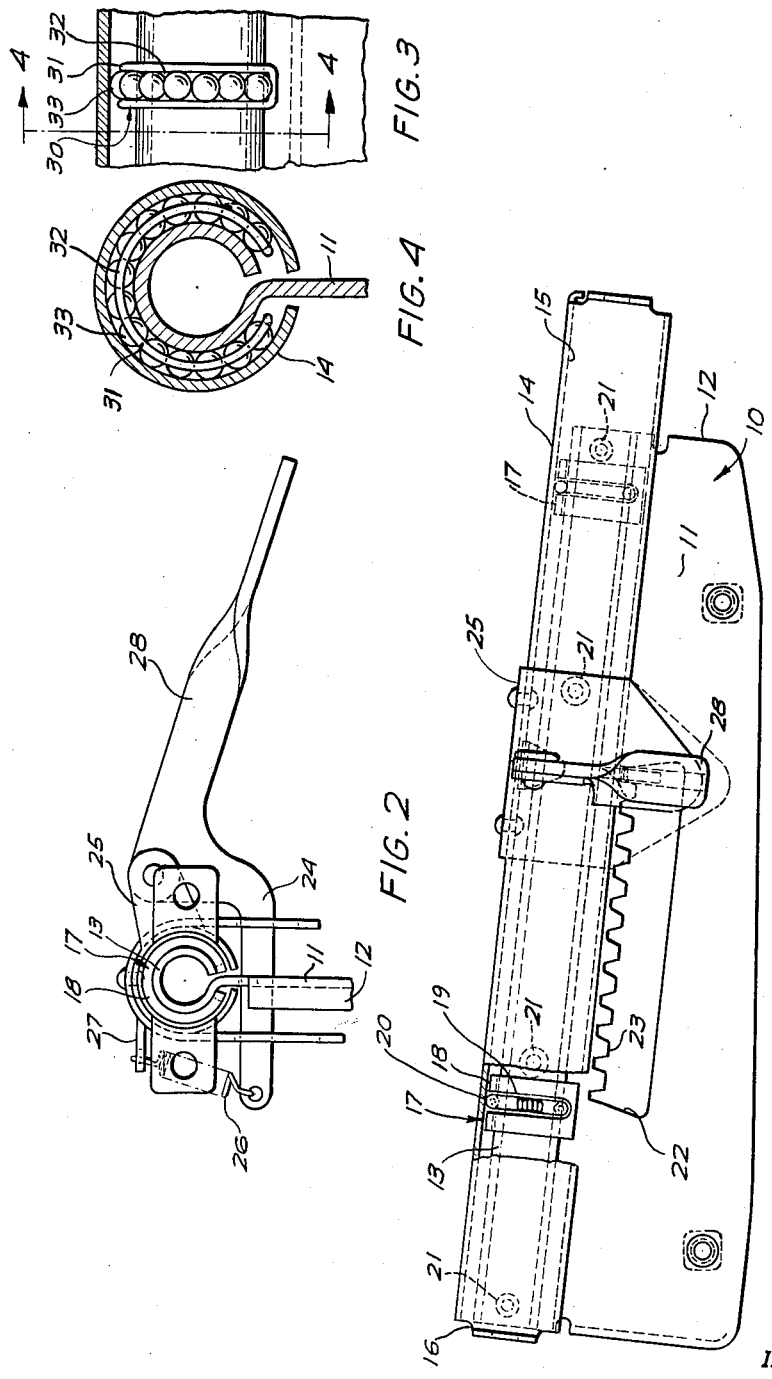
INVENTOR.
EDWARD D. DALL
BY
Barnes, Kisselle, Raisch, & Choate
ATTORNEYS

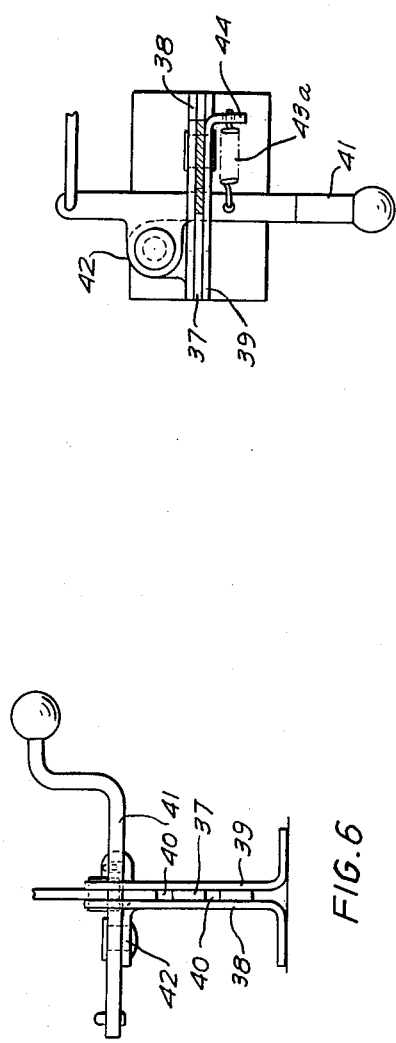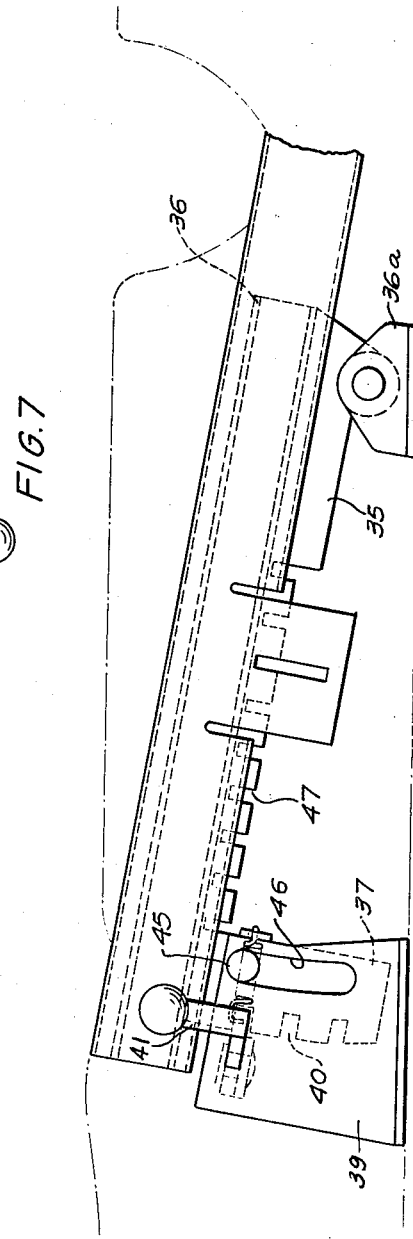

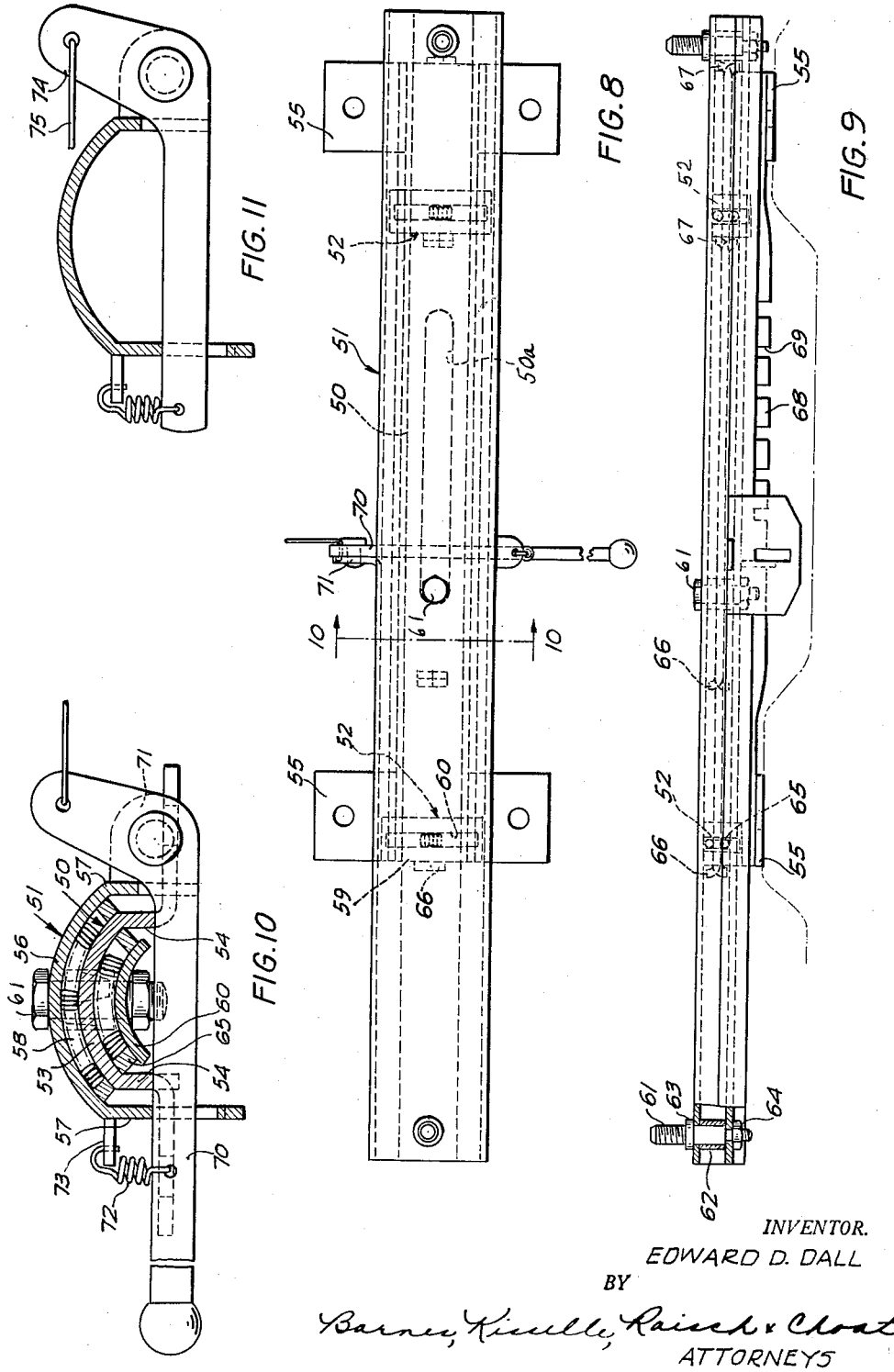

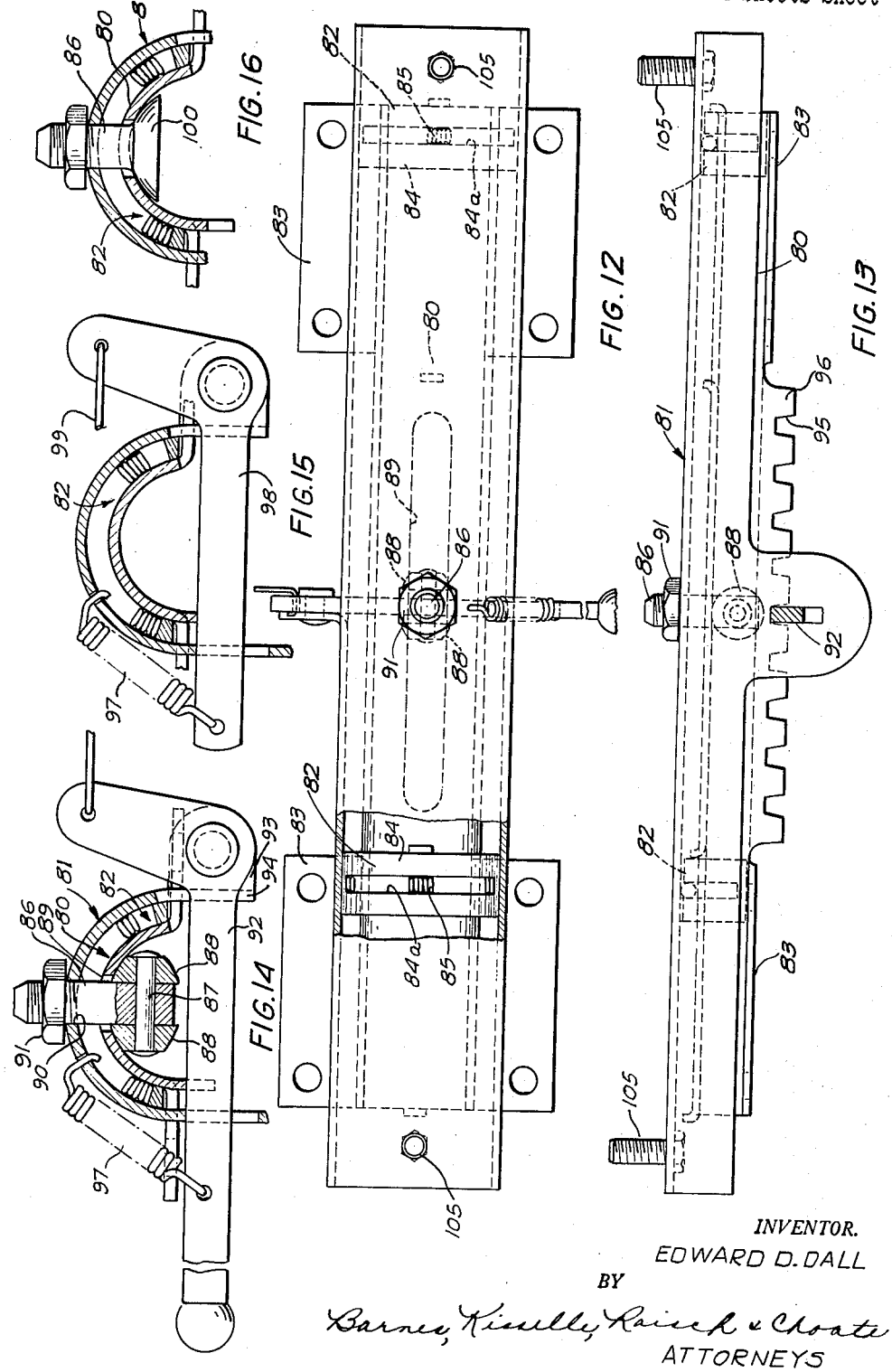

United States Patent Office 3,120,371
Patented Feb. 4, 1964

3,120,371
SEAT TRACK MECHANISM
Edward D. Dall, 30370 Vernon Drive, Birmingham, Mich.
Filed June 23, 1960, Ser. No. 38,304
9 Claims. (Cl. 248—397)

This invention relates to automobile seats and particularly to antifriction seat track mechanisms for automobile seats.

In my copending application Serial No. 792,153, filed February 9, 1959, and titled Seat Track Mechanism, now Patent No. 3,007,668, issued November 7, 1961, of which this application is a continuation-in-part, there is disclosed and claimed a novel seat track mechanism which comprises a generally tubular support mounted on the floor of a vehicle, a complementary tubular carriage mounted on the underside of the seat and having a surface surrounding a portion of the surface of the tubular support, and roller bearing means comprising a tightly wound helical wire spring interposed between the surfaces at longitudinally spaced points. Guide means are movable longitudinally with each roller bearing means independently of the carriage and the support for retaining the roller bearing means in longitudinally spaced relation and relative transverse position with the longitudinal axis of the tubular support.

It is an object of this invention to provide an improved seat track mechanism which incorporates a minimum number of parts.

It is a further object of the invention to provide such a seat track mechanism which, in addition, includes means for adjusting the up and down position of the vehicle seat in addition to the fore and aft position.

It is a further object of the invention to provide a seat track mechanism embodying novel bearing means.

It is a further object of the invention to provide a seat track mechanism which has a substantially reduced height permitting the seat track mechanism to be used in installations where there is low head room in the vehicle.

It is a further object of the invention to provide such a seat track mechanism which will freely operate without binding.

In the drawings:

FIG. 1 is a side elevation of a seat track mechanism embodying the invention.

FIG. 2 is a front end elevation of the seat track mechanism shown in FIG. 1.

FIG. 3 is a fragmentary sectional view of a modified form of roller bearing means.

FIG. 4 is a sectional view taken along the line 4—4 in FIG. 3.

FIG. 5 is a side elevation of a further modified form of the invention, parts being broken away.

FIG. 6 is a front elevation of the same, parts being broken away.

FIG. 7 is a fragmentary plan view of the portion of the mechanism shown in FIG. 6.

FIG. 8 is a plan view of a modified form of seat track mechanism.

FIG. 9 is a side elevation of the seat track mechanism shown in FIG. 8, parts being broken away.

FIG. 10 is a sectional view taken along the line 10—10 in FIG. 8.

FIG. 11 is a sectional view similar to FIG. 10 showing the latching mechanism on the opposite seat track, parts being broken away.

FIG. 12 is a plan view of a further modified form of seat track mechanism, parts being broken away.

FIG. 13 is a side elevation of the seat track mechanism shown in FIG. 12, parts being shown in section.

FIG. 14 is a sectional view taken along the line 14—14 in FIG. 12.

FIG. 15 is a sectional view similar to FIG. 14 showing the latching mechanism used on an adjacent seat track.

FIG. 16 is a sectional view similar to FIG. 14 showing a further modified form of the invention.

Referring to FIG. 1, a plurality of supports 10, usually two, are adapted to be mounted on the floor of a vehicle. Each support 10 comprises a single sheet metal member including a vertical panel or web 11 and an inwardly turned flange 12 that reinforces the panel 11 along the bottom and side edges. The upper end of panel 11 is bent to form a tubular support 13 that is adapted to extend longitudinally of the vehicle. A split tubular member 14 is telescoped over the support 13 providing an inner surface 15 complementary to the exterior surface 16 of support 13.

As shown in FIG. 1, roller bearing assemblies 17 are provided at longitudinally spaced points between surfaces 15, 16 and comprise generally rectangular sheet members 18 which are bent to form a cylinder with the ends thereof adjacent the panel 11 (FIG. 2) and having a slot 19 therein in which a tightly wound helical spring 20 is positioned to provide the roller bearing. The arrangement is such that if the carriage 14 is moved longitudinally of the support 13 the coil spring 20 rolls providing the bearing between the carriage 14 and support 13. Stops 21 are provided at longitudinally spaced points on the carriage 14 to limit the movement of the bearing assemblies 17.

A portion of the panel 11 is cut away centrally thereof as at 22 and the upper edge of the opening is formed with teeth 23 which are adapted to be engaged by a latch 24 to lock the carriage 14 in adjusted position on the support 13. As shown in FIG. 2, latch 24 is pivoted to a U-shaped bracket 25 fixed on the carriage 14 and is yieldingly urged into engagement with the teeth by a tension spring 26 that has one end thereof fastened to the latch 24 and the other end thereof fastened to a finger 27 struck out from the bracket 25. Latch 24 includes a handle 28 extending laterally outwardly and providing a means for grasping the latch to actuate it.

In practice, a pair of seat track mechanisms are provided for each seat and the latches of the mechanisms are interconnected by a rod or wire so that when one latch is operated, the other is also operated releasing the latches and permitting the seat to be adjusted longitudinally of the vehicle.

In the arrangement shown in FIGS. 1 and 2, the structure of the support 10 including the single sheet panel 11, flange 12 and support 13 formed by bending the upper end of panel 11 inwardly provides a simple and inexpensive construction which is, at the same time, sufficiently strong to withstand the stresses inherent in a seat mounted in a vehicle.

In the arrangement shown in FIGS. 3 and 4, the bearing assembly 30 comprises a wire guide member 31 having an opening 32 therein and a plurality of balls 33 providing the bearing between the surfaces. The guide member 31 for the balls comprises a wire which is bent to define a slot in which the balls 33 are positioned. The tightly wound helical spring 20 illustrated in FIGURE 1 can be used in combination with the wire guide member 31 instead of the balls 33.

In the arrangement shown in FIGS. 5 to 6, the seat track mechanism is provided for adjustment upwardly and downwardly in addition to fore and aft. As shown in FIG. 5, vertical panel 35 is made from a single sheet having the upper end thereof bent to form the tubular support 36. The rear end of the sheet 35 is pivoted about a horizontal axis to a base bracket 36a. The front end of the sheet 35 includes a flat extension 37 that is received between brackets 38, 39 (FIG. 6). The forward edge of extension 37 is formed with notches 40 that are engaged by a latch 41. Latch 41 is pivoted to a flange 42 on bracket 38 and extends through openings in the brackets 38 and 39 to selectively engage one of the notches 40. The latch 41 is yieldingly urged into engagement with the notches 40 by a tension spring 43a which has one end thereof fastened to the latch 41 and the other end thereof to a tang 44 struck outwardly from the bracket 39.

A pin 45 is fixed to the extension 37 and rides in an arcuate slot 46 in the bracket 39 to guide and limit the up and down swinging movement of the support 35 about its pivot on bracket 36.

The bearing assemblies between the carriage and support are identical as in the previous form of the invention and the lower edge of plate 35 is formed with notches 47 adapted to be engaged by a latch as in the form of the invention described in connection with FIGS. 1 and 2.

A further modified form of the invention is shown in FIGS. 8–11 and comprises a channel shaped support 50 adapted to be fixed to the floor of the vehicle and a movable channel shaped carriage 51 adapted to be fixed on the underside of a seat and mounted on the support 50 for movement longitudinally thereof by rolling bearing assemblies 52 positioned at longitudinally spaced points between the support 50 and carriage 51.

Specifically, channel shaped support 50 is made of sheet metal and comprises an upwardly curved portion 53 that is less than semicircular in cross section and downwardly extending flanges 54 along the side edges of arcuate portion 53. Integral brackets 55 are provided at longitudinally spaced points on the support 50 and serve as a means for mounting the support on the floor of the vehicle.

Channel shaped carriage 51 comprises a curved section 56 which is complementary to the configuration of arcuate portion 53 and downwardly extending flanges 57 along the side edges of the curved section 56.

Each roller bearing assembly 52 comprises at least one tightly wound helical spring 58 and a guide member 59 which maintains the spring 58 in position with its axis extending transversely of the longitudinal axes of support 50 and carriage 51. Guide member 59 comprises a rectangular piece of sheet metal which is curved to conform to the curvature of portion 53 and section 56 and has a slot 60 therein in which the helical spring 58 is positioned.

In order to prevent the carriage 51 from being displaced relative to the support 50, a guide member 60 is provided beneath the support 50 and extends beyond the ends of the support and is fixed to the carriage 51 by an arrangement which includes longitudinally spaced bolts 61 extending through the carriage 51 and guide member 60. A spacer 62 is provided on each bolt between the carriage 51 and guide member 60. Nuts 63, 64 threaded on the ends of the bolt 61 clamp the carriage 51 and guide member 60 together. One bolt is provided at each end of carriage 51 and guide member 60 and a bolt is provided intermediate the ends of carriage 51 and guide member 60 and extends through a slot 50a in support 50. The endmost bolts 61 are sufficiently long to serve as a means of attachment to the seat of the automobile. In order to minimize the friction that would be present if the guide member 60 contacted the underside of arcuate portion 53, the guide member 60 is spaced beneath the undersurface of arcuate portion 53 and additional roller assemblies 65 are provided at longitudinally spaced points between the underside of arcuate portion 53 of support 50 and guide member 60. Each of the roller bearing assemblies 65 is of identical construction to roller bearing assemblies 52.

In order to limit the movement of the carriage 51 relative to the support 50 and, in turn, maintain the roller bearing assemblies in their relative positions between the carriage 51 and support 50 and between the support 50 and guide member 60, tabs 66, 67 are struck upwardly and downwardly from the arcuate portion 53 of support 50 to limit the movement of the roller bearing assemblies. In use, when the carriage 51 is moved relative to the support 50, each roller bearing assembly moves half the distance that the carriage is moved.

A latching arrangement is provided for holding the carriage 51 in any fixed adjusted longitudinal position on support 50 and comprises a downwardly extending web 68 extending from one of the flanges 57 and having a plurality of notches 69 formed along the length thereof. A latch member 70 is pivoted to a tab 71 bent outwardly from the opposite flange 57 of support 51 and extending beneath the guide member 60 so that it is adapted to engage selectively the notches 69. A tension spring 72 extends between a tab 73 on flange 57 and the latch to urge the latch into engagement with the notches 69. As shown in FIG. 11, the latch 74 of an adjacent seat track mechanism is adapted to be connected to the latch having the handle shown in FIG. 10 by a link 75.

In use, the clearance between carriage 51, guide member 60 and support 50 can be varied in order to provide for a free movement by varying the tension on the nuts 63, 64.

The arrangement described in connection with FIGS. 8 to 11 provides for a seat track mechanism that has a very low vertical height permitting its use in vehicles which have a low or minimum amount of head room. In addition, the arcuate configuration of the carriage 51 and support 50 provides for a self-alignment in the event that the supports 50 are mounted in slightly misaligned position on the floor of the vehicle. This prevents any binding of the carriages as the seat is moved back and forth on the supports.

A further modified form of seat track mechanism is shown in FIGS. 12–16. This form of seat track mechanism is similar to that shown in FIGS. 8–11 but differs in that the elongated guide member 60 is replaced by a single centrally located guide member as presently described.

As shown in FIG. 14, the seat track mechanism comprises a support 80 that is semicircular in cross section and a complementary carriage 81 that is semicircular in cross section. Roller bearing assemblies 82 are positioned at longitudinally spaced points between support 80 and carriage 81. The support 80 includes integral laterally extending brackets 83 for mounting the support on the floor of the vehicle. Each roller bearing assembly 82 comprises a rectangular sheet metal member 84 curved to the same configuration as support 80 and carriage 81 having a slot 84a therein in which a tightly wound helical spring 85 is positioned.

The support 80 and carriage 81 are prevented from coming apart by an arrangement which includes a bolt 86 that is provided at one end with a shaft 87 on which rollers 88 are rotatably mounted. The rollers 88 have their contacting surfaces curved to engage the undersurface of support 80. The bolt 86 extends upwardly through a longitudinal elongated opening 89 in support 80 and circular opening 90 in carriage 81. A nut 91 is threaded on the upper end of the bolt 86.

When the carriage 81 is moved longitudinally of the support 80, bolt 86 and the rollers 88 are carried along with the carriage and engage the underside of the support 80 to prevent disengagement of the carriage 81 from the support 80. The rollers 88 contact the undersurface of the support 80 and minimize the friction between the bolt 86 and support 80.

A latching mechanism is provided for locking the carriage 81 in position on support 80 and comprises a latch 92 pivoted about a horizontal axis to a tab 93 bent out from the side of a flange 94 extending downwardly from carriage 81 and extending beneath the support 80. Latch 92 is adapted to engage one of a plurality of notches 95 in a web 96 extending downwardly from the other edge of carriage 81. A tension spring 97 extends between the latch and the carriage to yieldingly urge the latch 92 into position with one of the notches 95. As shown in FIG. 15, where the seat track mechanisms are used in pairs, the latch 98 is adapted to be connected to the latch 92 by a connecting link 99. Bolts 105 at the ends of the carriage serve as a means of attachment of the carriage to the automobile seat.

A further modified form of mechanism for retaining the carriage 81 on the support 80 comprises an integral head 100 on the bolt 86 instead of the rollers 88. The head 100 has a spherical surface which engages the underside of support 80 and with a minimum of friction. It can thus be seen that in the form of the invention shown in FIGS. 12 to 16 the height of the seat track mechanism is reduced substantially in the same manner as in the form shown in FIGS. 8 to 11 thereby permitting the seat to be at a lower height.

It can thus be seen that I have provided a simplified seat track mechanism which incorporates a construction that can be manufactured at low cost and which, in addition, provides for up and down in addition to the fore and aft movement.

This application is a continuation-in-part of my aforementioned application Serial No. 792,153.

I claim:

1. In a seat track, the combination comprising a base adapted to be supported on the floor of a vehicle, said base including a single thickness generally vertical web, the upper end of said web being bent to form a tubular support, the free edge of said upper end of the web extending adjacent said vertical web in such a manner that the tubular support is substantially seamless and imperforate, a complementary tubular carriage comprising a split tube adapted to be mounted on the underside of a seat and telescoped over the tubular support, roller bearing means interposed between the surfaces of said tubular support at longitudinally spaced points along said carriage, guide means for each said roller bearing means movable with said roller bearing means independently of said support and said carriage, said support having a plurality of longitudinally spaced teeth in the web thereof extending downwardly therefrom and latch means mounted on said carriage and adapted to selectively engage said teeth means for pivoting one end of said web to the floor of a vehicle for vertical swinging movement about a generally horizontal axis only, means adapted to be fixed to the floor for guiding the vertical swinging movement about said latter means on the other end of said web, said means for guiding said web comprising spaced walls fixed to the floor between which said web is movable, a latch pivotally mounted on one of said walls, and notches in said other end of said web adapted to be selectively engaged by said latch.

2. In a seat track, the combination comprising a tubular support, a complementary tubular carriage telescoped over the tubular support, roller bearing means interposed between the surfaces of said tubular support at longitudinally spaced points along said carriage, each said roller means comprising a tightly wound helical spring, and guide means for each said roller bearing means movable with said roller bearing means independently of said support in said carriage comprising a single piece of wire bent to form a slot into which said spring extends and is positioned.

3. In a seat track, the combination comprising a tubular support, a complementary tubular carriage telescoped over the tubular support, roller bearing means interposed between the surfaces of said tubular support at longitudinally spaced points along said carriage, each said roller means comprising a tightly wound helical spring, and guide means for each said roller bearing means movable with said roller bearing means independently of said support in said carriage comprising a single piece of wire bent to form a slot into which said spring extends and is positioned, said support having a longitudinally extending slot therethrough, and means mounted on said carriage and extending through said slot and engaging the undersurface of said support to prevent the vertical lifting of said carriage away from said support.

4. In a seat track, the combination comprising a base adapted to be supported on the floor of a vehicle, said base including a single thickness generally vertical web, the upper end of said web being bent to form a tubular support, the free edge of said upper end of the web extending adjacent said vertical web in such a manner that the tubular support is substantially seamless and imperforate, a complementary tubular carriage comprising a split tube adapted to be mounted on the underside of a seat and telescoped over the tubular support, the external surface of the support and the internal surface of the carriage being complementary, roller bearing means interposed between the external surface of said tubular support and the internal surface of said tubular carriage at longitudinally spaced points along said carriage, guide means for each said roller bearing means movable with said roller bearing means independently of said support and said carriage, said guide means maintaining said roller bearing means in substantially transverse relation to said support and said carriage, said support having a plurality of longitudinally spaced teeth in the web thereof extending downwardly therefrom and latch means mounted on said carriage and adapted to selectively engage said teeth, means for pivoting one end of said web to the floor of a vehicle for vertical swinging movement about a generally horizontal axis only, means adapted to be fixed to the floor for guiding the vertical swinging movement about said latter means on the one end of said web, and latch means pivotally mounted on said last-mentioned means for selectively engaging said other end of said web to hold the support in any pivotally adjusted position.

5. In a seat track, the combination comprising a base adapted to be supported on the floor of a vehicle, said base including a single thickness generally vertical web, the upper end of said base being bent to form a tubular support, the free edge of said upper end of the web extending adjacent said vertical web in such a manner that the tubular support is substantially seamless and imperforate, a complementary tubular carriage comprising a split tube adapted to be mounted on the underside of a seat and telescoped over the tubular support, the external surface of the support and the internal surface of the carriage being complementary, roller bearing means interposed between the internal surface of said tubular support and the external surface of said tubular carriage at longitudinally spaced points along said carriage, guide means for each said roller bearing means movable with said roller bearing means independently of said support and said carriage, said guide means maintaining said roller bearing means in substantially transverse relation to said support and said carriage, said support having a plurality of longitudinally spaced teeth in the base thereof extending downwardly therefrom and latch means mounted on said carriage and adapted to selectively engage said teeth, means for pivoting one end of said base to the floor of a vehicle for vertical swinging movement about a generally horizontal axis only, means adapted to be fixed to the floor for guiding the vertical swinging movement about the said latter means on the other end of said base, and latch means pivotally mounted on said last-mentioned means for selectively engaging said other end of said base to hold the support in any pivotally adjusted position.

6. In a seat track, the combination comprising a base adapted to be supported on the floor of a vehicle, means for pivoting the rear end of said base to the floor of the vehicle for movement about a generally horizontal axis only, means adapted to be fixed to the floor for guiding a vertical swinging movement of said base about said latter means, latch means pivotally mounted on said last-mentioned means for selectively engaging said base to hold the base in any pivotally adjusted position, a carriage mounted on said base, and roller bearing means interposed between said carriage and said base for guiding the movement of said carriage longitudinally of said base forwardly and rearwardly of the vehicle.

7. In a seat track, the combination comprising a support adapted to be mounted on the floor of a vehicle, said support being arcuate in transverse cross section and having an angular extent of not greater than 180 degrees, a complementary carriage adapted to be mounted on the underside of a seat, said carriage being arcuate in cross section and having an angular extent of not greater than 180 degrees, roller bearing means interposed between the surfaces of said tubular support at longitudinally spaced points along said carriage, guide means for each said roller bearing means movable with said roller bearing means independently of said support on said carriage, said roller bearing means comprising tightly wound helical springs extending transversely of said support and carriage.

8. In a seat track, the combination comprising a support adapted to be mounted on the floor of a vehicle, said support being arcuate in transverse cross section and having an angular extent of less than 180 degrees, a complementary carriage adapted to be mounted on the underside of a seat, said carriage being arcuate in cross section and having an angular extent of less than 180 degrees, roller bearing means interposed between the surfaces of said tubular support at longitudinally spaced points along said carriage, guide means for each said roller bearing means movable with said roller bearing means independently of said support on said carriage, the length of said carriage being greater than the length of said support, and a guide member having substantially the same length as said carriage fixed to said carriage in vertically spaced relationship thereto and extending beneath said support, and roller bearing means interposed between the surface of said support and said guide member at longitudinally spaced points along said carriage, and guide means for each said roller bearing means movable with said roller bearing means independently of said support and said carriage, said means for mounting said guide member on said carriage comprising adjustable spacer means whereby the vertical distance between said carriage and said guide member may be adjusted.

9. In a seat track, the combination comprising a one piece base adapted to be supported on the floor of a vehicle, said base including a single thickness generally vertical web, the upper end of said web being bent to form a tubular support, the free edge of said upper end of the web extending adjacent said vertical web in such a manner that the tubular support is substantially seamless and imperforate, a complementary tubular carriage comprising a split tube adapted to be mounted on the underside of a seat and telescoped over the tubular support, the external surface of the support and the internal surface of the carriage being complementary, roller bearing means interposed between the external surface of said tubular support and the internal surface of said tubular carriage at longitudinally spaced points along said carriage, guide means for each said roller bearing means movable with said roller bearing means independently of said support and said carriage, said guide means maintaining said roller bearing means in substantially transverse relation to said support and said carriage, said support having a plurality of longitudinally spaced teeth in the web thereof extending downwardly therefrom, latch means mounted on said carriage and adapted to selectively engage said teeth, means for pivoting one end of said web to the floor of a vehicle for movement about a generally horizontal axis only, means adapted to be fixed to the floor for guiding the vertical swinging movement about said latter means on the other end of said web, and latch means on said last-mentioned means for selectively engaging said other end of said web to hold the support in any pivotally adjusted position.

References Cited in the file of this patent
UNITED STATES PATENTS

| 1,759,922 | Templeton | May 27, 1930 |
| 2,225,929 | Sarazin | Dec. 24, 1940 |
| 2,490,341 | Davis | Dec. 6, 1949 |
| 2,579,597 | Moroney | Dec. 25, 1951 |
| 2,794,690 | Bullock | June 4, 1957 |
| 2,840,139 | Ragsdale | June 24, 1958 |
| 3,007,668 | Dall | Nov. 7, 1961 |

FOREIGN PATENTS

| 441,393 | Great Britain | Jan. 20, 1936 |